No. 886,295. PATENTED APR. 28, 1908.
W. D. HODGSON.
FEED WATER REGULATOR AND ALARM.
APPLICATION FILED NOV. 25, 1907.

2 SHEETS—SHEET 1.

WITNESSES
INVENTOR
William D. Hodgson
By Parker & Burton
Attorneys.

No. 886,295. PATENTED APR. 28, 1908.
W. D. HODGSON.
FEED WATER REGULATOR AND ALARM.
APPLICATION FILED NOV. 25, 1907.

2 SHEETS—SHEET 2.

WITNESSES
Clarence E. Day
C. C. Jennings

INVENTOR
William D. Hodgson
By Parker & Burton
Attorneys.

UNITED STATES PATENT OFFICE.

WILLIAM D. HODGSON, OF DETROIT, MICHIGAN, ASSIGNOR TO ALEXANDER J. McDONOUGH, OF DETROIT, MICHIGAN.

FEED-WATER REGULATOR AND ALARM.

No. 886,295.     Specification of Letters Patent.     Patented April 28, 1908.

Application filed November 25, 1907. Serial No. 403,641.

*To all whom it may concern:*

Be it known that I, WILLIAM D. HODGSON, a citizen of the United States, residing at Detroit, county of Wayne, State of Michigan, have invented a certain new and useful Improvement in Feed-Water Regulators and Alarms, and declare the following to be a full, clear, and exact description of the same, such as will enable others skilled in the art to which it pertains to make and use the same, reference being had to the accompanying drawings, which form a part of this specification.

My invention relates to high and low water alarms and feed water regulators for steam boilers, and means for regulating the supply of water to the boiler, and consists in the improvements hereinafter described and pointed out in the claims.

Figure 1:
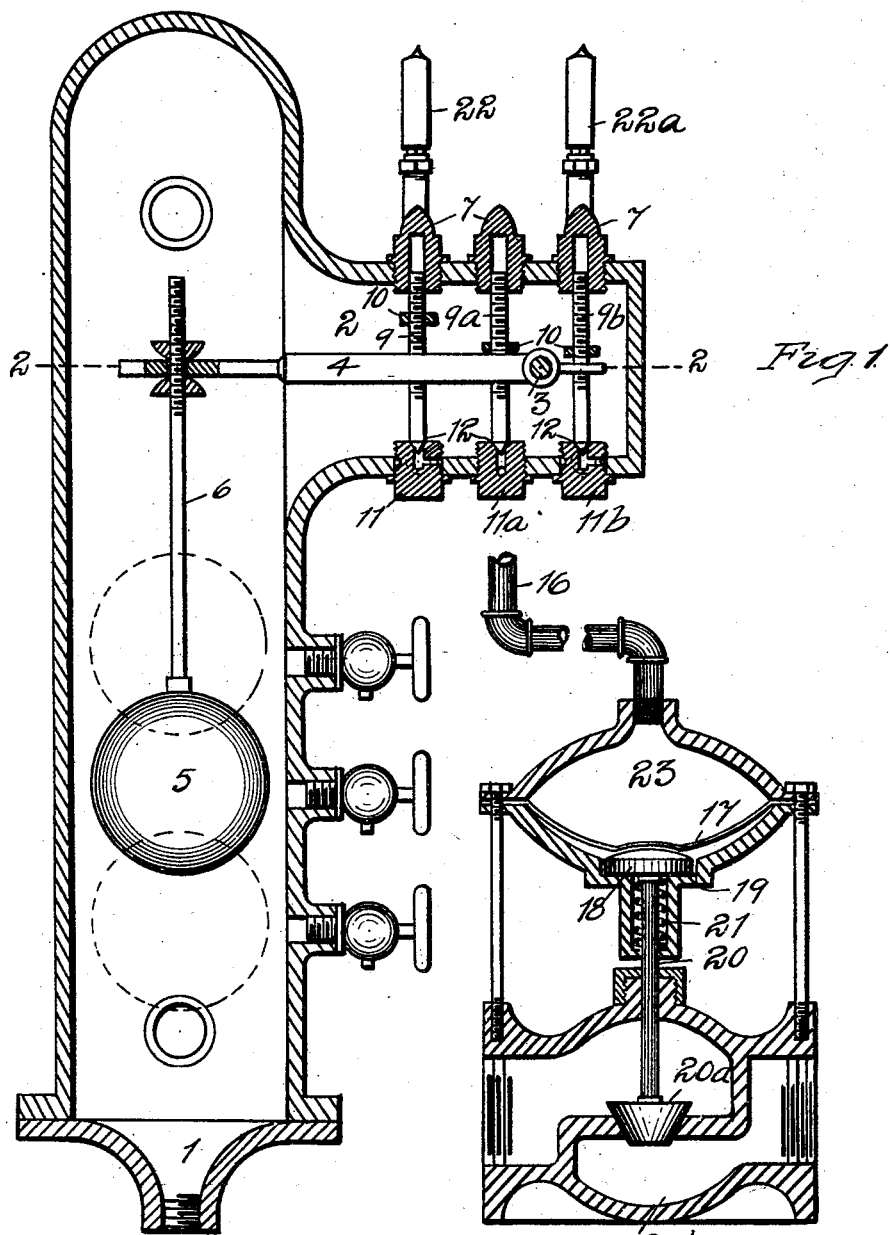
Figure 2:
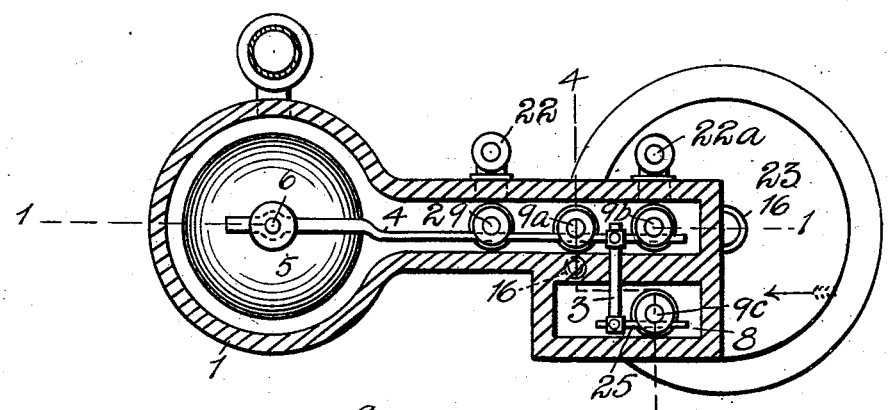
Figure 3:
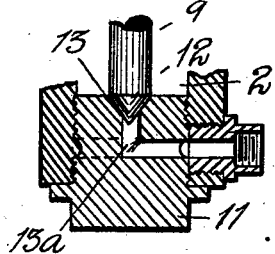
Figure 4:
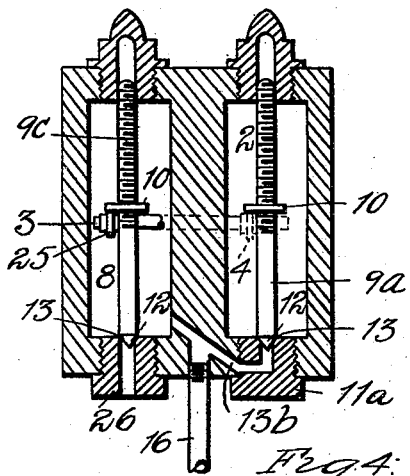

Referring to the accompanying drawing:— Figure 1, is a sectional view of an apparatus embodying my invention, the section being taken in the plane indicated by the line 1—1 Fig. 2. Fig. 2, is a section taken in the plane indicated by the line 2—2 Fig. 1. Fig. 3, is a detail sectional view on the line 3—3 Fig. 2. Fig. 4, is a detail sectional view on the line 4—4 Fig. 2.

1 represents a portion of a water column.

2 is a laterally extending chamber closed at its outer end and communicating at its inner end with the water column 1.

4 is a lever secured to a shaft 3, pivoted in a wall of the chamber 2, and extending into the water column 1.

5 is a float connected toward the outer end of an arm of the lever 4 by rod 6, so that the movement of said float shall actuate said lever.

7, 7, 7, are sleeves or caps extending through the wall of the chamber 2, and secured rigidly therein.

9, $9^a$, $9^b$, are rods provided with screw threads along their lengths and adapted to slide in sleeves 7, the latter serving as a guide for said rods. The lower end of each of the rods 9, $9^a$, $9^b$, is shaped to form a valve 12.

10 is a nut, its screw threads engaging the threads upon a rod 9, $9^a$, $9^b$. The nut 10 may be adjusted along the rod by turning it relative thereto.

11, $11^a$, $11^b$, are plugs extending into and through a wall of the chamber 2. Each of said plugs is provided at its inner end with a valve seat 13 upon which the valve 12 is adapted to fit to close a passage $13^a$ in said casting. The lever 4 is so located that when the arm of said lever to which the float 5 is connected rises with said float, it contacts the nut 10 upon the rod 9, said rod lifting the valve 12 from its seat and allowing the steam to pass into the passage $13^a$.

22 is a steam whistle connected with the plug 11, and communicating with the passage $13^a$, so that when the valve 12 is lifted from its seat 13, the whistle 22 will be sounded by the escaping steam.

$13^b$ is a passage extending laterally from the passage $13^a$, in the plug $11^a$, and connecting with the interior of an auxiliary chamber 8, which chamber communicates by a pipe 16 with a casing 23 in which is a diaphragm 17. The passage is easily formed by passing a drill through the opening into which the plug $11^a$ fits, and slantingly upward into the auxiliary chamber 8. The diaphragm 17 extends across the casing 23, and is adapted to be actuated by a pressure of steam passing to the casing 23 from the passage $13^a$ through the pipe 16.

19 is a cylindrical chamber concentric with the casing 23 at the bottom thereof, and communicating at its upper end with the interior of said casing.

18 is a cylindrical piston in the chamber 19, having a convex upper end extending from said chamber. The diaphragm 17 rests upon the piston 18.

21 is a helical spring bearing against the piston 18, and acting to force it out of the cylinder 19.

20 is a rod connected with the piston 18, and adapted to control the passage of water to the boiler by an apparatus which is well understood, and is therefore not shown.

When the piston 18 is thrown out of the cylinder 19, the diaphragm 17 is raised from the bottom of the casing 23, and the steam entering said casing acts upon the entire surface of said diaphragm to press the piston again into said cylinder. When it has pressed the piston 18 down, as shown in the drawing, the diaphragm rests against the upper surface of said piston, and against the lower surface of the casing 23, so as to reinforce the strength of said diaphragm and prevent its being broken by an excess of pressure.

20 is a valve adapted to control the passage of water through the section *b*, to the boiler, when the piston 18 is forced down it closes the valve 20ª.

The caps 7 are screwed into position in the wall of the chamber 2, and may be easily removed therefrom, and when so removed, the rod 9, 9ª, or 9ᵇ, may be withdrawn through the opening left, and the position of the nut 10 adjusted upon said rod, or the valve 12 may be ground or fitted, and the valve 13 repaired, and the parts may be easily readjusted.

When the water becomes too high in the boiler, the float 5 is lifted, oscillating the lever 4, raising the valve 12 from its seat 13, allowing the steam to pass through the passage 13ª, and sound the whistle 22, and also lifting the rod 9ª in the same way, and allowing the steam to pass to the casing 23, pressing the diaphragm 17 down, and closing the passage for water to the boiler. When the water in the boiler again falls, the valve 12 again returns to its seat.

The shaft 3 extends through the partition between the chambers 2 and 8 into the latter chamber, where it is provided with a lever arm 25 extending in a direction away from the water column 1, and adapted to lift a valve rod 9ᶜ by means of a nut 10 therein and open a passage to the outer air through a plug 26.

The lever 4 extends beyond the shaft 3, and upon this side of said shaft engages an apparatus entirely similar to that above described for sounding an alarm to indicate that the water is too high in the boiler.

When the water in the boiler falls, the float 5 descends, drawing the arm of the lever 4 to which it is attached with it. This raises the arm 25, and opens the passage 26, allowing the steam to escape from the casing 23, and the valve 20ª to be raised by the spring 21. When the float 5 has descended a considerable distance, the end of the lever remote from said float contacts the nut 10 on the rod 9ᵇ, opens the passage in the plug 11ᵇ, and sounds the whistle 22ª.

What I claim is:—

1. In a device of the kind described, the combination of a casing, a chamber 2, therein, a lever 4 in said chamber, an auxiliary chamber 8, a shaft extending into each of said chambers, said lever being secured to said shaft, an arm 25 extending from said shaft in said auxiliary chamber upon the opposite side of said shaft, a valve apparatus 13, 9ª in the chamber 2 upon one side of said shaft adapted to be operated by the lever 4, a valve apparatus 13, 9ᶜ, in the auxiliary chamber adapted to be operated by the arm 25, an opening through the bottom of one of said chambers, said casing being provided with a conduit extending from said opening into the other of said chambers, a plug adapted to fill said opening and provided with a passage communicating with said conduit and adapted to be controlled by one of said valve apparatus, a pressure controlled actuating apparatus communicating with the auxiliary chamber, the first mentioned valve apparatus being adapted to control the passage between said chambers, said casing being provided with an exhaust passage controlled by the second mentioned valve apparatus substantially as and for the purpose described.

2. In a device of the kind described, the combination of a casing, a chamber 2 therein, a lever 4 in said chamber, an auxiliary chamber 8, a shaft extending into each of said chambers, said lever being secured to said shaft, an arm 25 extending from said shaft in said auxiliary chamber upon the opposite side of said shaft, a valve apparatus 13, 9ª, in the chamber 2, upon one side of said shaft adapted to be operated by said lever 4, a valve apparatus 13, 9ᶜ, in the auxiliary chamber adapted to be operated by the arm 25, a pressure controlled actuating apparatus communicating to the auxiliary chamber, said casing being provided with a passage between said chambers controlled by the first mentioned valve apparatus, and an exhaust passage controlled by the second mentioned valve apparatus, substantially as and for the purpose described.

In testimony whereof, I sign this specification in the presence of two witnesses.

WILLIAM D. HODGSON.

Witnesses:
ALECIA TOWNSEND,
ELLIOTT J. STODDARD.